Sept. 8, 1959
G. H. MYERS
2,903,185
ELECTRICAL INTEGRATION
Filed Feb. 12, 1957
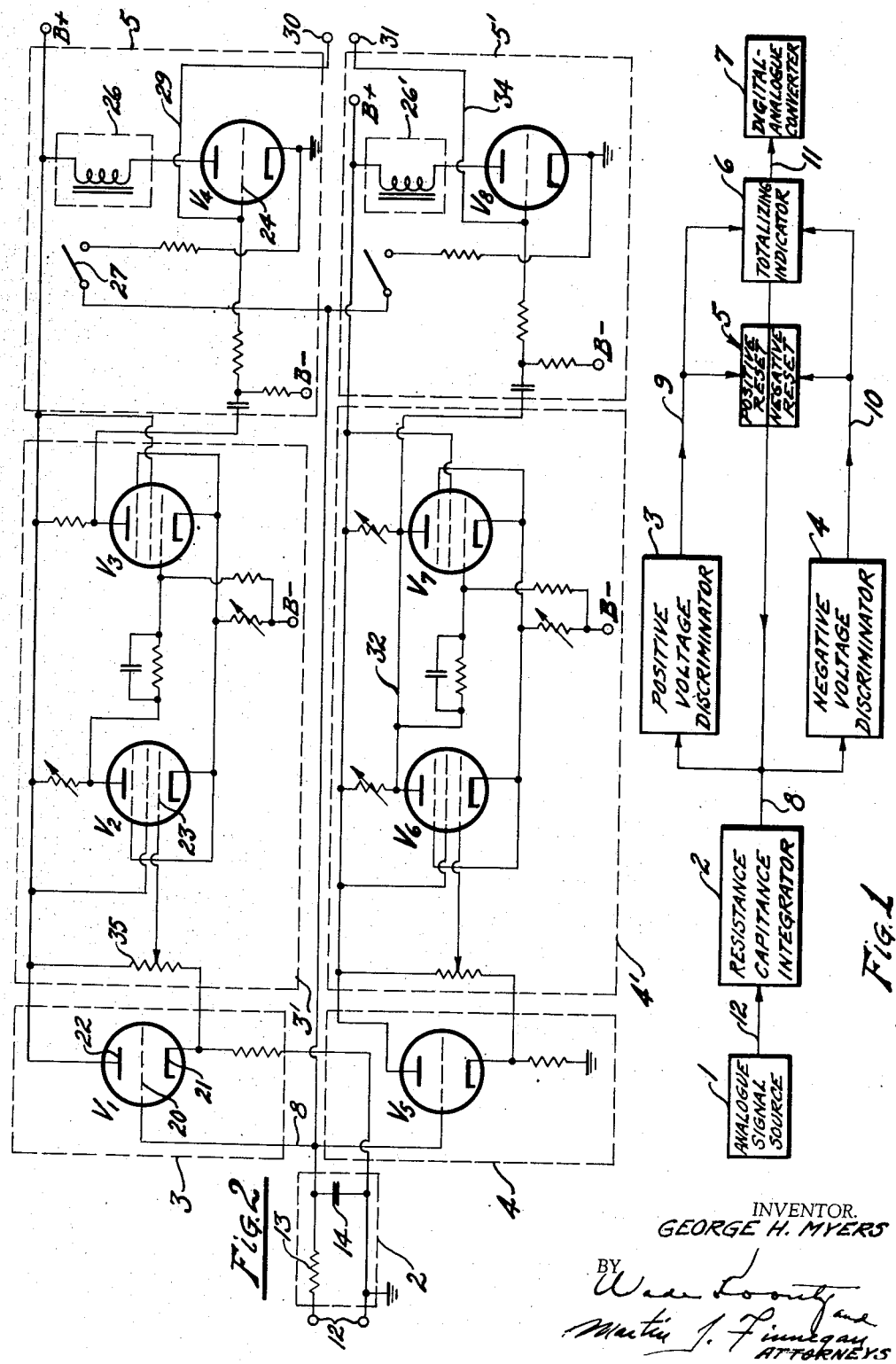
INVENTOR.
GEORGE H. MYERS
BY
ATTORNEYS

United States Patent Office 2,903,185
Patented Sept. 8, 1959

2,903,185

ELECTRICAL INTEGRATION

George H. Myers, Rome, N.Y.

Application February 12, 1957, Serial No. 639,835

1 Claim. (Cl. 235—183)

(Granted under Title 35, U.S. Code (1952), sec. 266)

The invention described herein may be manufactured and used by or for the United States Government for governmental purposes without payment to me of any royalty thereon.

This invention relates to electrical integration, and more particularly to integration utilizing resistance-capacitor circuitry.

An object of the invention is to provide electronic integration with automatic recycling.

In the typical resistance-capacitor integrator, the output is approximately the integral of the input. The maximum value of the output is limited not only by the input voltage value, but also by the breakdown voltage of the capacitance factor. The minimum value is limited by noise and interference, and by the accuracy of the means available for measuring small voltage values. For the foregoing reasons, devices which require integrators capable of producing large values of the integral, as in automatic navigation systems, have usually employed mechanical integrators, in which the integral is stored as a shaft angle. With such an integrator, very large values of the integral may be accumulated, but for many purposes the use of moving parts is a severe disadvantage.

Another disadvantage in the utilization of mechanical integrators resides in the necessity for double handling of the information: first, in the transformation of an electrical signal into a mechanical motion, and secondly, in again transforming the resultant integral from a mechanical motion to an electrical signal. The present invention makes it possible to eliminate such double transformation.

In accordance with the invention a resistor-capacitor integrator operates in a conventional manner in receiving analogue input signals until the value of the integral as determined by its output voltage reaches a predetermined positive or negative value. At this instant a signal is provided to reset the integrator to zero, thereby performing the operation of recycling the integrator, and simultaneously a signal is provided representative of the aforesaid output voltage of the integrator which is registered upon a totalizing indicator such as a bi-directional electronic counter to advance or retard the count by one. Thus the invention provides automatic registration of the number of integrating cycles traversing the resistance-capacitor network. This in effect constitutes a conversion operation whereby rapidly cycling integration actions representative of analogue values are converted into more slowly operating digital computing mechanism.

A wide range electronic integrator may be provided by the combination of a resistance-capacitor integrator (or other electronic integrator) operating in a normal manner until the value of the integral (as determined by the output voltage or current) reaches a predetermined critical positive or negative value. At this time, a totalizing indicator such as a bi-directional counter is either advanced or retarded by one count, and the integrator reset to zero. The process may then begin again. The state of counter is translated into a direct voltage by a digital-to-analogue converter.

Thus the invention provides, in combination with a resistor-capacitor integrator which is automatically recycled, a totalizing indicator capable of digital storage and registration of the number of integrating cycles.

The invention also provides, in combination with a resistor-capacitor integrator which is automatically recycled, and a totalizing indicator capable of digital storage to register the number of integrating cycles, a digital-to-analogue converter which will, in effect, register the number of integrating cycles and display the result in analogue form.

Considered from another aspect, the invention provides a combination of analogue integrator and digital storage unit functioning as an analogue-to-digital converter, in which the integral of an analogue voltage is converted into a digital quantity.

Another object of this invention is to provide an electronic integrator capable of handling substantially any electrical signal information presented thereto, regardless of the diversity of its content, range-wise.

These and other objects of the invention will be apparent from the following description and figures in which:

Fig. 1 is a block diagram illustrative of the invention; and

Fig. 2 is a circuit diagram showing certain of the electrical components referred to in the block diagram.

Referring to Fig. 1, there is shown a generalized block diagram of an integration device representative of this invention. The voltage fed into resistor-capacitor integrator 2 is derived from analogue signal source 1 which may be the output of an automatic navigation system. The output voltage $V_1$ of integrator 2 appears on lead 8. If $V_1$ is greater than zero the net integral is positive, and if $V_1$ is less than zero the integral is negative.

Positive voltage amplitude discriminator 3 receives its input $V_1$ from line 8. If its input voltage $V_1$ is increasing and passes through a predetermined critical voltage $+V_0$, then a positive pulse will appear on "count-up" lead 9.

Negative voltage amplitude discriminator 4 receives its input $V_1$ also from line 8. If its input $V_1$, is decreasing in an algebraic sense (that is, becoming more negative), and passes through a predetermined critical negative voltage, $-V_0$, a positive pulse will appear on "count-down" lead 10.

When a positive pulse appears on either of the count leads, 9 or 10, "reset" 5 resets the integrator output $V_1$, appearing on lead 8, to zero. Thus, if the integrator is of resistor-capacitor type, reset 5 could momentarily short-circuit the integrating capacitor.

As a positive pulse appears on either of count leads, 9 or 10, automatically resetting integrator 2, simultaneously the pulse is registered in totalizing indicator 6. This indicator includes a device such as a bi-directional counter whose count increases by one when it receives a positive pulse on lead 9, and decreases by one unit when it receives a positive pulse on lead 10. Thus the number of integrating cycles traversing the resistance-capacitor integrator 2 is stored. In effect the analogue signals fed into integrator 2 are converted into digital information which is stored in totalizing indicator 6. The count stored in totalizing indicator 6 is a measure of the recycling of integrator 2. Integrator 2 is reset when its output reaches a predetermined critical voltage of either $+V_0$ or $-V_0$. Therefore, the state of the count in indicator 6 times the voltage of either $+V_0$ or $-V_0$ provides a means for extending the range of operation of electrical resistor-capacitor integrators.

Digital-converter 7, as disclosed in U.S. Patent 2,718,634, receives its input from lead 11 which carries the state of count of totalizing indicator 6. Converter 7 produces an output voltage which is proportional to the count existing in totalizing indicator 6. We, thereby, provide means for extending the dynamic range of an electrical integration network.

Totalizing indicator 6 may also include a visual indication such as a bank of lights or Inditron tube. The visual indicator may be lights attached to the various stages of the aforementioned bi-directional counter. This provides a visual indication of the state of the counter to the human operator of an automatic navigation system.

Fig. 2 is a schematic diagram of the integration circuit which is automatically recycled. Integrator 2 is comprised of resistor 13 and capacitor 14. Integrator 2 is adapted to receive an analogue input signal from terminals 12.

The positive amplitude discriminator circuit is comprised of cathode follower 3 and Schmitt trigger circuit 3'. The Schmitt trigger circuit is disclosed in "Electronics" by W. Elmore and M. Sands on pages 99 to 103, published by McGraw-Hill Book Company, Inc., 1949. Cathode follower 3 is utilized to isolate integrator 2 from Schmitt trigger circuit 3'.

A predetermined critical voltage, for example, +20 volts is selected as the voltage at which the integrator 2 will be reset. Trigger circuit 3' is adjusted so that tube $V_2$ is normally cut off and tube $V_3$ is conducting. The voltages are so adjusted that tube $V_2$ will conduct when it receives as input voltage of the aforesaid +20 volts. When integrator 2 receives analogue signals the value of the integral, as determined by the output voltagle of integrator-capacitor 14 increases. This voltage is impressed upon grid 20 of cathode follower tube $V_1$ by way of lead 8. This voltage then appears upon cathode 21 of tube $V_1$, thereby effectively isolating integrator 2 from trigger circuit 3'. This voltage is impressed upon potentiometer 35, and then appears upon grid 23 of tube $V_2$. When this voltage reaches an amplitude of 20 volts at grid 23, tube $V_2$ becomes conducting and $V_3$ stops conducting. The plate voltage of $V_3$ rises, causing a positive pulse to appear at grid of tube $V_4$ which is part of reset circuit 5. $V_4$ is normally held to cut off by its bias, but the pulse from $V_3$ causes it to conduct, thus energizing relay 26. Switch 27 is thereby closed shorting integrator-capacitor 14 and discharging it to zero. Simultaneously trigger circuit 3' changes its state back to its original condition wherein tube $V_2$ is cut off and tube $V_3$ is conducting, as on coherent property of this circuit is the ability to change its state at one input voltage when the input voltage is increasing, but is changed back to its original condition at a much lower value. We now have the means whereby integrator 2 may be recycled automatically at a predetermined critical voltage.

When a positive pulse appears at grid 24 of tube $V_4$ to cause the tube to conduct and energize relay 26, simultaneously the same pulse is transmitted to output terminal 30 by way of lead 29. This pulse is then in the form of digital information and may be utilized in a totalizing indicator or a digital computing mechanism.

The circuitry for negative amplitude discriminator 4 and 4' and reset circuit 5' is identical to positive amplitude discriminator 3 or 3' and reset circuit 5 except for one difference, the positive pulse energizing reset circuit 5' comes from the plate of $V_6$ by way of lead 32. The pulse going to terminal 31 by way of lead 34 is positive and may be utilized to count down in totalizing indicator or a digital computing mechanism.

What is claimed is:

In a wide range electronic integration circuit, an electrical integrating network adapted to receive input signals whose polarity and magnitude vary in accordance with variation in the analogue representations of a control condition, a pair of cathode followers each adapted to receive the output voltage from said integration network, said pair of cathode followers having separate outputs, a first multivibrator arranged to be triggered by a predetermined critical positive voltage and adapted to receive the output voltage from one of said pair of cathode followers, a second multivibrator arranged to be triggered by a predetermined negative voltage and adapted to receive the output voltage of the other of said pair of cathode followers, a first electron discharge device biased to cut-off and becoming conductive upon receiving a positive output pulse from said first multivibrator when said multivibrator is triggered, a first switch associated with said first electron discharge device operating to discharge said integration network when said first electron discharge conducts, control means to reset said first multivibrator and switch-off said first electron discharge device when said integrating circuit is discharged, a second discharge device biased to cut-off and becoming conductive upon receiving a negative output pulse from said second multivibrator when said multivibrator is triggered, a second switch associated with said second electron discharge device operating to discharge said integrating circuit when said second electron discharge device conducts, control means to reset second multivibrator and to switch off said second electron discharge device when said integrating circuit is discharged, counting and indicating means adapted to receive the positive and negative output pulses from said first and second multivibrators, and means to convert the digital count to an analogue voltage.

References Cited in the file of this patent

UNITED STATES PATENTS 2,864,556    Raymond    Dec. 16, 1958

FOREIGN PATENTS 1,079,188    France    May 19, 1954
762,221    Great Britain    Nov. 28, 1956

OTHER REFERENCES

Electronics (Elmore et al.), 1949, pages 99–103.